US011010470B2

(12) United States Patent
Animireddygari et al.

(10) Patent No.: US 11,010,470 B2
(45) Date of Patent: May 18, 2021

(54) ANTI-VIRUS FILE SYSTEM CACHE FOR OPERATING SYSTEM REMEDIATION

(71) Applicant: Microsoft Technology Licensing, LLC, Redmond, WA (US)

(72) Inventors: Gowtham R. Animireddygari, Bellevue, WA (US); Karthik Selvaraj, Kirkland, WA (US); Adrian M. Marinescu, Sammamish, WA (US); Catalin D. Sandu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 15/844,453

(22) Filed: Dec. 15, 2017

(65) Prior Publication Data

US 2019/0188380 A1    Jun. 20, 2019

(51) Int. Cl.
*G06F 21/56* (2013.01)
*G06F 11/14* (2006.01)

(52) U.S. Cl.
CPC ........ *G06F 21/564* (2013.01); *G06F 11/1448* (2013.01); *G06F 11/1451* (2013.01); *G06F 11/1464* (2013.01); *G06F 11/1469* (2013.01); *G06F 21/568* (2013.01); *G06F 2201/80* (2013.01); *G06F 2201/805* (2013.01); *G06F 2201/82* (2013.01); *G06F 2201/86* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 6,971,018 B1* | 11/2005 | Witt | ....................... | G06F 21/52 705/57 |
| 7,392,542 B2 | 6/2008 | Bucher | | |
| 7,756,834 B2* | 7/2010 | Masters | ............... | G06F 21/568 707/640 |
| 7,784,098 B1* | 8/2010 | Fan | ..................... | G06F 11/1471 726/24 |
| 8,055,613 B1* | 11/2011 | Mu | ..................... | G06F 11/1451 707/610 |

(Continued)

OTHER PUBLICATIONS

"International Search Report and Written Opinion Issued in PCT Application No. PCT/US18/062393", dated Feb. 13, 2019, 11 Pages.

(Continued)

*Primary Examiner* — Michael W Chao

(57) ABSTRACT

A system for operating system remediation intercepts input/output (I/O) requests to write to one or more files and stores, as file restore data, (i) a restore copy of the one or more files to the system cache prior to performing write operations of the I/O requests and (ii) identification information for one or more processes or entities making the corresponding I/O requests in the system cache. The system reverts to the restore copy of the one or more files using the file restore data and based at least on a later determination that one or more processes making the corresponding I/O requests was malware. A current version of the one or more files is thereby replaced with the restore copy of the one or more files with improved automatic remediation support and a greater likelihood that data can be restored from the cache in the case of malware attacks.

20 Claims, 6 Drawing Sheets

(56) References Cited

U.S. PATENT DOCUMENTS

| | | | |
|---|---|---|---|
| 8,087,061 B2 | 12/2011 | Jarrett | |
| 8,726,391 B1* | 5/2014 | Zhong | G06F 21/56 |
| | | | 726/25 |
| 8,918,878 B2 | 12/2014 | Niemela | |
| 9,098,333 B1* | 8/2015 | Obrecht | G06F 9/50 |
| 9,317,686 B1* | 4/2016 | Ye | G06F 11/1461 |
| 9,514,309 B1* | 12/2016 | Mann | G06F 21/60 |
| 9,645,892 B1* | 5/2017 | Patwardhan | G06F 11/1464 |
| 9,721,095 B2 | 8/2017 | Levine-Fraiman | |
| 9,813,443 B1* | 11/2017 | Subramanian | H04L 63/145 |
| 9,894,045 B1* | 2/2018 | Mao | H04L 63/061 |
| 9,977,894 B2* | 5/2018 | Gilbert | G06F 21/564 |
| 10,460,107 B2* | 10/2019 | Crofton | G06F 11/1464 |
| 10,516,688 B2* | 12/2019 | Tamir | G06F 11/1464 |
| 10,540,509 B2* | 1/2020 | Ashkenazi | G06F 21/50 |
| 10,810,088 B1* | 10/2020 | Gu | G06F 16/125 |
| 2002/0032671 A1* | 3/2002 | Iinuma | G06F 16/10 |
| 2003/0221075 A1* | 11/2003 | Achiwa | G06F 11/1448 |
| | | | 711/162 |
| 2006/0161988 A1* | 7/2006 | Costea | G06F 21/56 |
| | | | 726/25 |
| 2007/0100905 A1 | 5/2007 | Masters et al. | |
| 2008/0294859 A1* | 11/2008 | Nguyen | G06F 11/1461 |
| | | | 711/162 |
| 2009/0016190 A1* | 1/2009 | Jakob | G06F 3/0605 |
| | | | 369/109.01 |
| 2009/0049550 A1* | 2/2009 | Shevchenko | G06F 21/52 |
| | | | 726/23 |
| 2009/0077664 A1* | 3/2009 | Hsu | G06F 21/566 |
| | | | 726/24 |
| 2009/0328221 A1* | 12/2009 | Blumfield | G06F 21/564 |
| | | | 726/24 |
| 2010/0043072 A1* | 2/2010 | Rothwell | G06F 21/566 |
| | | | 726/24 |
| 2010/0287407 A1* | 11/2010 | Basu | G06F 11/2094 |
| | | | 714/6.12 |
| 2012/0124007 A1* | 5/2012 | Sten | G06F 11/1448 |
| | | | 707/685 |
| 2013/0067576 A1* | 3/2013 | Niemela | G06F 21/568 |
| | | | 726/24 |
| 2013/0167235 A1* | 6/2013 | Kapoor | G06F 21/56 |
| | | | 726/24 |
| 2013/0212437 A1* | 8/2013 | Timashev | G06F 9/44589 |
| | | | 714/37 |
| 2014/0081911 A1* | 3/2014 | Deshpande | G06F 11/1448 |
| | | | 707/610 |
| 2014/0081920 A1* | 3/2014 | Itasaki | G06F 16/178 |
| | | | 707/654 |
| 2014/0095451 A1* | 4/2014 | Wang | G06F 11/1469 |
| | | | 707/679 |
| 2014/0101757 A1* | 4/2014 | Gnesda | G06F 21/562 |
| | | | 726/22 |
| 2014/0236902 A1* | 8/2014 | Zhu | G06F 11/1446 |
| | | | 707/654 |
| 2015/0113650 A1* | 4/2015 | Sallam | G06F 21/562 |
| | | | 726/23 |
| 2015/0172304 A1* | 6/2015 | Kleczynski | H04L 63/1416 |
| | | | 726/23 |
| 2016/0314291 A1* | 10/2016 | de Luna | G06F 21/34 |
| 2016/0371152 A1 | 12/2016 | Parshin et al. | |
| 2016/0378988 A1* | 12/2016 | Bhashkar | G06F 21/568 |
| | | | 726/24 |
| 2017/0364681 A1* | 12/2017 | Roguine | G06F 21/554 |
| 2018/0285204 A1* | 10/2018 | Dwarampudi | G06F 11/3055 |
| 2019/0050296 A1* | 2/2019 | Luo | G06F 11/1458 |
| 2019/0278661 A1* | 9/2019 | Mehta | G06F 11/1451 |
| 2020/0034532 A1* | 1/2020 | Muttik | G06F 21/64 |

OTHER PUBLICATIONS

Abade, Igor, "Ransomware and OneDrive", Retrieved from<<https://www.tshooter.com.br/en/2016/07/18/ransomware-and-one-drive/>>, Jul. 18, 2016, 5 Pages.

Scaife, et al., "CryptoLock (and Drop It): Stopping Ransomware Attacks on User Data", in Proceedings of IEEE 36th International Conference on Distributed Computing Systems, Jun. 27, 2016, pp. 303-312.

* cited by examiner

ANTI-VIRUS FILE SYSTEM CACHE FOR OPERATING SYSTEM REMEDIATION

BACKGROUND

Files are increasingly the target of different types of malware, such as file infectors that modify the system files to subvert the system behavior and damage or sabotage the user's files for ransom (e.g., ransomware). These files are used to maintain system state and are an important manifestation of data for consumers and enterprises.

Operating system file remediation is a known problem in the operating system space and different file checker or backup applications are presently used to maintain "clean" copies of the files. However, the existing solutions generally work only for executable files serviced by an operating system update. However, operating systems also rely on configuration files, such as hosts, group policy settings, system service configuration files, etc. Malicious applications can target any of these files.

Moreover, the existing solutions operate at a system level, which results in a tedious manual process for creating restore files. For example, users can create backups of data, though not all users do this and the ones that do, may not be doing so on an ongoing basis. Additionally, while backup applications can revert to a safe restore (e.g., rollback of files from a shadow copy), this can result in loss of user configuration data along with malware changes depending on when the last backup occurred. Automatic remediation across the system using presently available solutions is also extremely performance intensive and exhaustive, making it infeasible in many situations.

Further, backing up to a network share may not necessarily be safe during a ransomware attack. If the backup or restoration cannot be performed in the ransom scenario, even after the ransom has been paid, data may not be restored.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for operating system remediation comprises intercepting input/output (I/O) requests to write to one or more files and storing, as file restore data, (i) a restore copy of the one or more files to system cache prior to performing write operations of the I/O requests and (ii) identification information for one or more processes or entities making the corresponding I/O requests. The computerized method further comprises reverting to the restore copy of the one or more files using the file restore data and based at least on a later determination that one or more processes making the corresponding I/O requests was malware.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to enable anti-virus file system cache for operating system remediation, such as to recover user data after a malware attack or in the case of data loss due to ransomware. An anti-virus application in some examples maintains a cache of system files known as targets by malware and modified by an unknown process image file. Later when the unknown process is determined to be malware, the system files modified by the malware can be reverted to a pre-malware state using the non-affected copies of the files in the cache or other restore data that allows for reverting to a previous version or initial content of the files.

The anti-virus application in one example is configured to update a system file list through malware detection metadata that correlates with the process and/or program that modified the files. Thus, in contrast to backup applications where there is no context of "who changed what" and if a file is known to be corrupted, there being no way to determine what version of the file to which reversion should occur, the present disclosure creates a limited repository of files with respect to space and time that can be used to undo the changes by malicious applications (using information also regarding the processes modifying the files), such as in the recent past. This capability allows for improved automatic remediation support for system files and a greater likelihood that a user's data can be restored from the cache in the case of malware attacks. As a result, user experience is improved and the functioning of the computing device is also improved.

Figure 1:
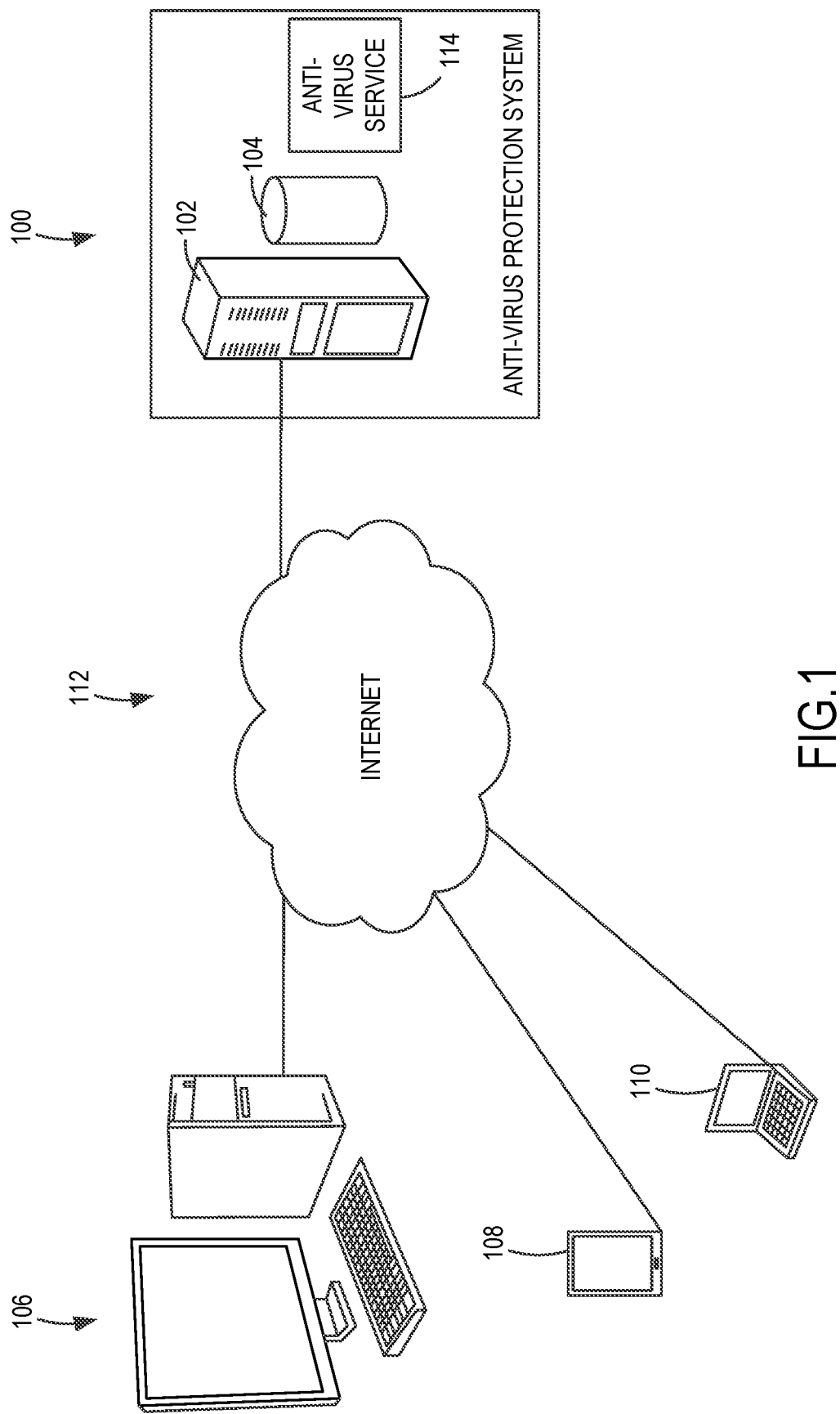
FIG. 1 is an exemplary block diagram illustrating an anti-virus protection system according to an embodiment.

FIG. 1 is a schematic block diagram of an anti-virus protection system 100 deployed as a cloud service in this example. However, the anti-virus protection system 100 can be deployed in non-cloud application, such as at local devices. The anti-virus protection system 100 includes one or more computers 102 and storage 104 to store anti-virus detection information (e.g., malware detection metadata) in some examples. The anti-virus protection system 100 is connected to one or more end user computing devices, such as a desktop computer 106, a smart phone 108 and a laptop computer 110. For example, the anti-virus protection system 100 is shown as connected to the end user computing devices via a computer network 112, illustrated as the Internet.

The anti-virus protection system 100 is configured to operate using an anti-virus service 114 that remediates system data corruption by malware, which in some examples includes restoring an affected file (e.g., a file modified by malware) to a version of the file prior to the malware modification. It should be appreciated that some or all of the anti-virus protection system 100 or the functionality of the anti-virus protection system can be implemented within the end user computing device. For example, as described in more detail herein, interception of certain operations are performed by the end user computing device.

The anti-virus protection system 100 uses malware detection metadata (such as an updated metadata set) in combination with cached files to restore malware modified files to a pre-malware modified version, such as a version of the file stored in a cache memory (e.g., central processing unit (CPU) hardware cache or random-access memory (RAM)). In some examples, the malware detection metadata can include signatures, heuristics, data to drive emulation, dynamic translation, cloud queries, machine learning, such as machine data learning models, behavioral analysis, etc.

In some examples, the functionality of the anti-virus protection system 100 described herein is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The anti-virus protection system 100 in various examples is configured to remediate system data corruption of different file types by malware. The anti-virus protection system 100 is configured to perform automatic remediation of a generic class of malware in one example, which modifies data or files belonging to the operating system. For example, malware detection metadata defines a list of system binary files and configuration files targeted by malware, such as system file infector malware like ursnif, Alureon, and Win32/Patched that modify system binaries to adversely affect operating system behavior. The anti-virus protection system 100 includes the ant-virus service 114 that implements a cache of the modified system files in a secure location protected by a filter driver and that can be used to clean or automatically restore files to a previous version not modified by malware, and which include user modifications (e.g., user settings). Thus, the anti-virus protection system 100 in some examples maintains a per process cache that keeps tracks of a defined set of files (in various examples, a defined set of selected files), which may be defined by file type, that are modified by the system.

Figure 2A:
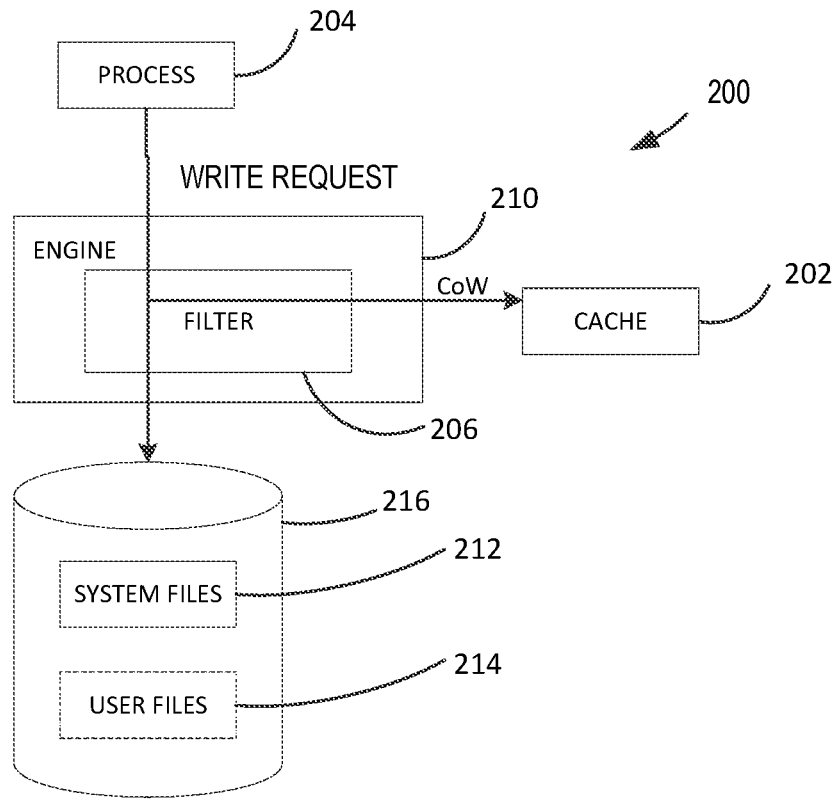
FIG. 2A is an exemplary block diagram illustrating creating file copies according to an embodiment.
Figure 2B:
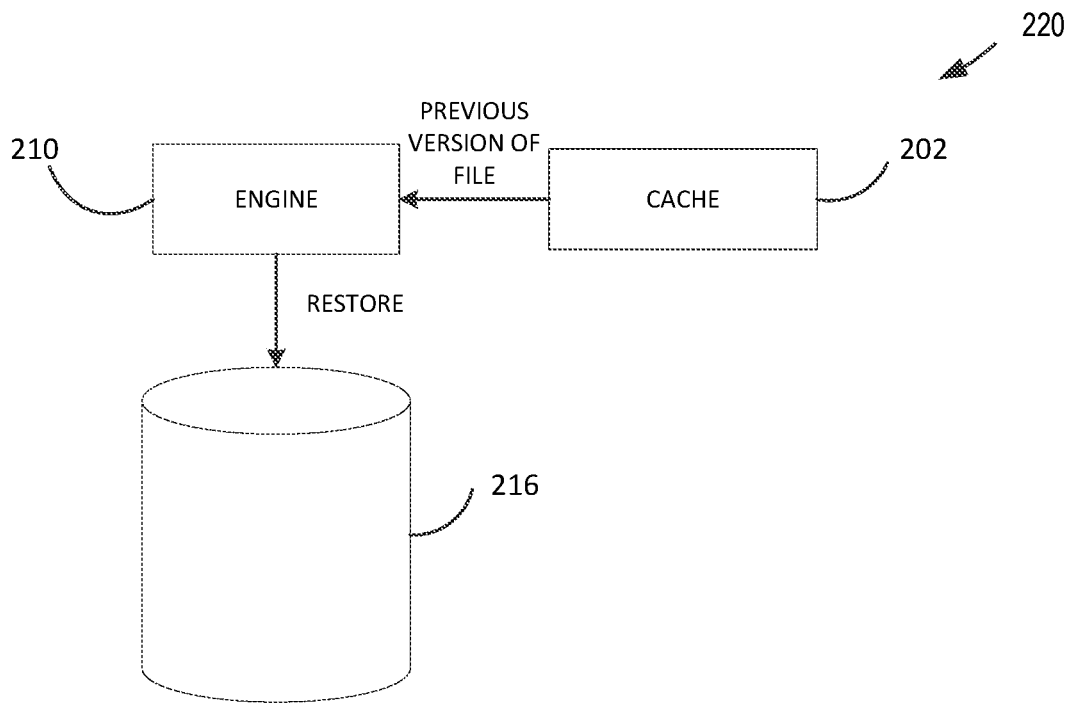
FIG. 2B is an exemplary block diagram illustrating restoring a previous file version when malware is detected.

FIGS. 2A and 2B illustrate file caching and restoration. Specifically, FIG. 2A illustrates a file caching process 200 to create restore copies of a file and FIG. 2B illustrates a file restoration process 220 to restore a previous version of the cached file when malware is detected. The file caching process 200 and file restoration process 220 are be services that can be a part of or embodied as the anti-virus service 114 of FIG. 1.

With particular reference to FIG. 2A, the file caching process 200 utilizes a cache 202, which is a file system cache, for remediating operating system data (and user data in certain examples) from corruption by malware. For example, the cache 202 stores a restore copy of certain types of files prior to a writing operation (write request from a process 204) being performed on the file, resulting in the files, which include system files 212 and optionally user files 214, being written to storage 216. The system files 212 include different types of files, such as an executable binary/dynamic link library (dll) file or a static file upon which the operating system relies (e.g., a host.config file) in one example. However, it should be appreciated that the cache 202 can store any type of file, which may be defined and changed as desired or needed. In one example, the cache 202 stores restore copies of system files 212, including at least one of configuration files, browser setting files, executable files, shortcut files, or initialization files. Thus, the file caching process 200 uses a defined list, such as a list of system binary files and configuration files (which can define file names and/or file types), targeted by malware when caching files. As such, a limited cache is maintained (e.g., limited in time and/or space) with files and associated information regarding the process 204 that recently modified the files, resulting in an improved likelihood of remediating data modified by malware.

In some examples, the restore copy is not a complete or entire copy of the file. Instead, the restore copy is a portion of the file or diffing information (incremental information) that allows for recreation of the original file (e.g., the file prior to write operation or modification by malware). In some examples, the restore copy is an entire copy of the file, such as a copy of the file prior to the write operation or modification by malware).

The file caching process 200 implements the cache 202 of the modified system files (prior to modification) in a secure location protected by a filter 206, which in this example is an operating system file filter that may be implemented as the filter driver. The filter 206 performs a Copy-On-Write (CoW) operation upon detecting that a write request includes a file in the defined list, resulting in a copy of the file being written to the cache 202 before the write operation is performed on the file. In some examples, the defined list of selected files to be protected by the CoW operation is modified on a regular basis, such as based on the number of malware attacks on a particular file or file type over a period of time, a length of time since the last malware attack on a particular file or file type, etc.

When files that may be subjected to malicious behavior on the operating system have a write request made with respect to any of the files, an engine 210 (configured in some examples as an anti-virus engine) filters the write request and make a copy of the file prior to the write. Thus, a version of the file prior to the write operation being performed is stored in the cache. Thereafter, if it is determined that one or more of the systems files 212 or user files 214 have been modified by malware, such as based on malware detection metadata from an updated malware detection metadata set, the engine 210 triggers an additional step during remediation, and restore files from the cache 202 (e.g., a previous version of the file) modified by the malware, thus restoring the operating system to a normal operating state prior to the malware attack as illustrated in the file restoration process 220 shown in FIG. 2B

Thus, the file caching process 200 and the file restoration process 220 are together configured to restore data, including the system files 212 and/or user files 214, after the detection of a malware attack (e.g., a ransomware attack), thereby providing a level of security and reliability in the operation of the operating system (e.g., protect high value data and minimize downtime due to cyberthreats). The automatic data recovery from cache 202 and improved remediation experience results in improved user satisfaction and user confidence in malware protection capabilities resulting from implementation of the present disclosure.

For example, the file caching process 200 and the file restoration process 220 can be implemented by target users such as, but not limited to:

Enterprise users—Enterprise users affected by malware/ransomware can use the anti-virus protection capability to restore business critical data stored on a work device. In some examples, the restoration of pre-malware versions of files is performed with reduced or minimum end user involvements (e.g., user inputs) using the cache 202.

Enterprise administrators—Enterprise Administrators can use the present disclosure to provide policy controls to configure the herein described anti-virus protection feature based on user and environment needs.

Operating system Consumers—Operating system consumers affected by malware/ransomware can use the anti-virus protection capability to restore personal data on a work device. Again, in some examples, the restoration of pre-malware versions of files is performed with reduced or minimum end user involvements using the cache 202.

Thus, file caching and operating system remediation is performed with the cache 202 using CoW principles to copy the files modified by unknown processes and/or applications. In some examples, all applications on a first run on the system go through the file caching process 200. The engine 210 is configured to perform restore cache protection based on different criteria, such as the severity level of the malware, the type of files, etc. Depending on the different criteria, the frequency at which the engine 210 operates to determine whether files have been modified by malware is defined. For example, in the case of a significant or "major" malware (e.g., WannaCry and Petya), the file restoration process 220 performs file remediation operations within a shorter time period, such as forty-eight hours. In other cases, the file remediation operations are performed by the file restoration process 220 at longer periodic intervals, such as seven days or fourteen days. Thus, the file caching process 200 and the file restoration process 220 provide a reliable cache to restore the file changes performed by zero-day malware even if the malware detection metadata is not available.

Additionally, based on the amount of attacks, frequency of attacks, severity of attacks, and other factors, the file restoration process 220 can automatically adjust the frequency of the remediation, as well as the types of files that are stored in the cache 202 during the file caching process 200. Thus, the file caching process 200 and the file restoration process 220 are dynamically configurable in some examples, such that the filter 206 performs filtering on different file paths (e.g., file paths eligible for Copy-On-Write on engine load change). In some examples, the cache 202 file system c is limited in size and has file size limits, file extension filtering and folder exclusions to avoid cache over flow. For example, if a modification to a file is made by a trusted program, even if the file has an extension that is eligible for copying to the cache 202, the file is not stored in the cache 202.

Thus, various examples described herein can act as another layer of protection against malware attacks with other anti-virus protection mechanisms or can be a stand-alone protection feature. The file caching process 200 and the file restoration process 220 are configured to provide malware remediation by:

1. Determining if the operating system security state was modified due to which system files of interest were modified;

2. Adding files 212 or 214 to the cache 202 before such a modification;

3. Restoring the affected file(s) from the cached version (e.g., a previous version); and 4. Distributing the reconfigurable signature of files that need to be cached.

Thus, the file caching process 200 and the file restoration process 220 are configured to detect and restore files (such as in a remediation or recovery process) that have been modified by malware. As a specific application example, the file caching process 200 and the file restoration process 220 perform automatic remediation for a ransomware family without malware detection metadata using runtime signatures to detect the active process as ransomware and remediate as described herein. The file caching process 200 and the file restoration process 220 can be used to restore the files modified after regular remediation. As another application example, the file caching process 200 and the file restoration process 220 are configured to allow for ransomware data recovery for a ransomware family without malware detection metadata or runtime malware detection metadata. The file caching process 200 and the file restoration process 220 allow zero-day ransomware to run as described herein. Future malware detection metadata or cloud signatures can be used to detect the ransomware, then file caching process 200 and the file restoration process 220 restore as many files as possible. It should be noted that in some examples, other impacted files not available in cache due to storage restrictions are maintained. This aspect allows for periodic review of the storage limits of the cache 202.

As another application example, ransomware recovery and automatic remediation are performed using a default expiry for cached files, such as four-hour malware detection metadata updates (or another defined time period (X)) or forty-eight-hour malware detection metadata updates (or another defined time period (Y)), whichever is later. User defined expiry times can be set for different system files. In yet another application example, automatic remediation for malware families is performed, which updates system files, such as executable (exec) or configuration (config) files (e.g., Hosts) that adversely affect system behavior. Malware detection metadata are used to flag the list of system config/exec files, which are targeted by malware, and these files are copied on writes across the system. During remediation of all malwares, a check is performed to determine if the threat has modified system files (e.g., config files), and if modified, the file is restored to the version before the malware change. Additionally, files under Controlled Folder Access (CFA) default are prioritized in some examples, when CFA is bypassed, or CFA is off. Also, "rogue" store application changes and applications with permissions to specific folders (e.g., folders with images) are monitored. Store application cached changes expire in some examples based on a time period defined by an encryption policy (e.g., Universal Store KPI) to respond to malicious store applications. Notifications to the user can be performed based on an in place restore location or automatic restore in a special folder that is predefined.

Figure 3:
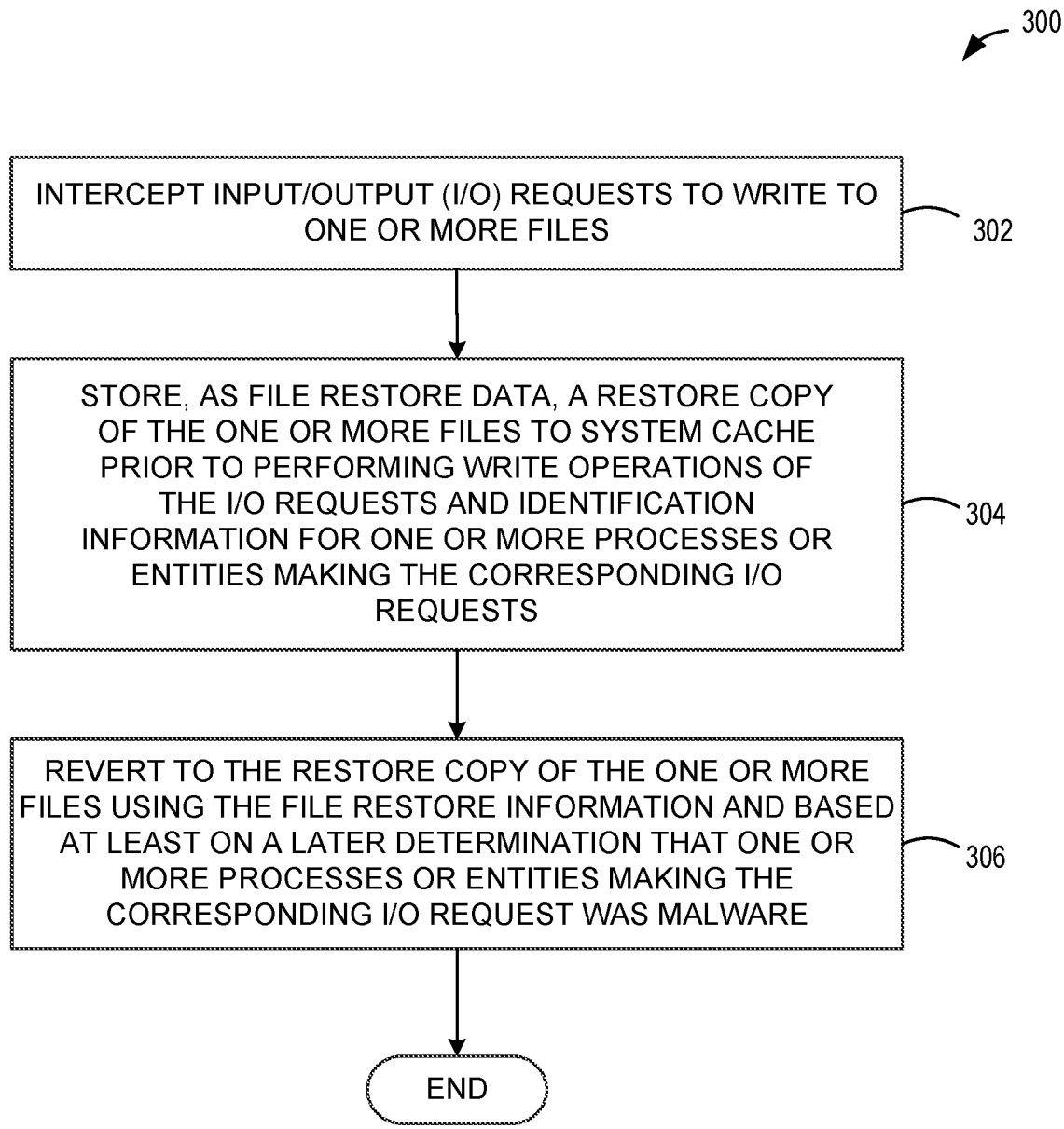
FIG. 3 is an exemplary schematic block diagram illustrating a file recovery and operating system remediation process according to an embodiment.

FIG. 3 illustrates an exemplary flow chart of a method 300 for file recovery and operating system remediation. In particular, this figure is an exemplary flow chart illustrating operations of a computing device to store and later recover restore copies of files that have been modified by malware, such as using the file caching process 200 and the file restoration process 220. The operations illustrated in the flow charts described herein may be performed in a different order than is shown, may include additional or fewer steps and may be modified as desired or needed. Additionally, one or more operations may be performed simultaneously, concurrently or sequentially.

In particular, at 302, the computing device, which includes at least one processor and a system cache (e.g., the cache 202 shown in FIG. 2) is configured to store file modification information and intercept I/O requests to write to one or more files. For example, if a file to be written to is on a malware protect list (e.g., configuration files, browser setting files, executable files, shortcut files, or initialization files), the computing device stores a copy of the file in the cache before the file is modified. Thus, a previous version of the file is stored in cache immediately before the system writes to the file. As should be appreciated, this version of the file includes pre-modification data, as well as user data (e.g., user defined settings). The cache thereby has an immediately available restore copy of the file, which may be used as a revert or restore file if it is later determined that the I/O request was made by malware. That is, the cached file does not include any of the modifications written as part of the I/O requests from the malware and may be used, for example, if a malware detection metadata update indicates that the I/O request was malicious.

More particularly, at 304, the computing device stores, as file restore data, a restore copy of the one or more files to the system cache prior to performing write operations of the I/O requests and also stores identification information for one or more processes or entities making the corresponding I/O requests in the system cache (e.g., the process, module and/or script, or any entity, making the I/O request). Thus, upon a malware detection metadata update, the computing device determines whether the one or more processes making the corresponding I/O requests in the system cache was malware (e.g., using malware detection metadata, such as updated malware detection metadata including an updated virus signature) and can restore to a pre-malware modified version of the file stored in cache. In some examples, the computing device quarantines files determined to be modified by malware in a quarantine store, but that determination was a false positive. In this case, the computing device restores a current version of the one or more quarantined files based on a user input indicating that the one or more quarantined files were not modified by malware and the quarantine of the one or more files was a result of a false positive. Thus, in some examples, both the previously stored version of the file and the version of the file suspected of being modified by malware are both maintained.

It should be noted that in some examples the computing device is configured to exclude certain files from being cached, such as files modified by a protected process. Thus, files known to be capable of only being modified by non-malware are not stored in the system cache. This allows for the less space to be used in the system cache, which in some examples, has a maximum size. When the maximum size is exceeded, the computing device removes stored files (e.g., oldest files or files least likely to be modified by malware or files of a particular type). Also, different restore file types may be added or removed based on different criteria as described herein. In one example, the computing device is configured to automatically remove as a restore file type or add as a restore file type in system cache based at least on a duration since a last quarantine for that particular file type (or file).

Additionally, the computing device in some examples operates in different modes with respect to the anti-virus protection. For example, in an active mode, files are cached as described herein and restored upon detection of a modification to a file by malware. In an audit mode, the store operation is performed without reverting to the restore copy of the one or more files.

At 306, the computing device reverts to the restore copy of the one or more files stored in the system cache based at least on a determination that one or more processes that made the corresponding I/O request was malware. For example, the infected file is cleaned by replacing that file with a previous version of the file stored in the system cache, which was not modified by the malware. A persisted metastore is provided in some examples that defines a periodicity of a malware detection metadata update based at least upon a level of threat of the malware. Thus, based on the malware detection metadata update, the computing device removes a current version of the file previously modified by malware and reverts to a previous version of the file stored in the system cache that existed prior to the malware modification.

The method 300 is capable of anti-virus file system caching and operating system remediation in different scenarios and is not limited to the herein described examples. Thus, different ransomware and malware scenarios are contemplated, wherein the user is given different options for proceeding. For example, post malware or ransomware attack, a notification may be provided informing the user that the recently affected files can be restored and giving the user options, such as remediate all files in the system cache (that correspond to affected files) to the original location of the files or dismiss automatic remediation and access a predefined location for recovered files. The restoration of files can be automatically performed. In some examples, a default user behavior to provide or suppress notification may be determined, which can be changed by a user or administrator.

Figure 4:
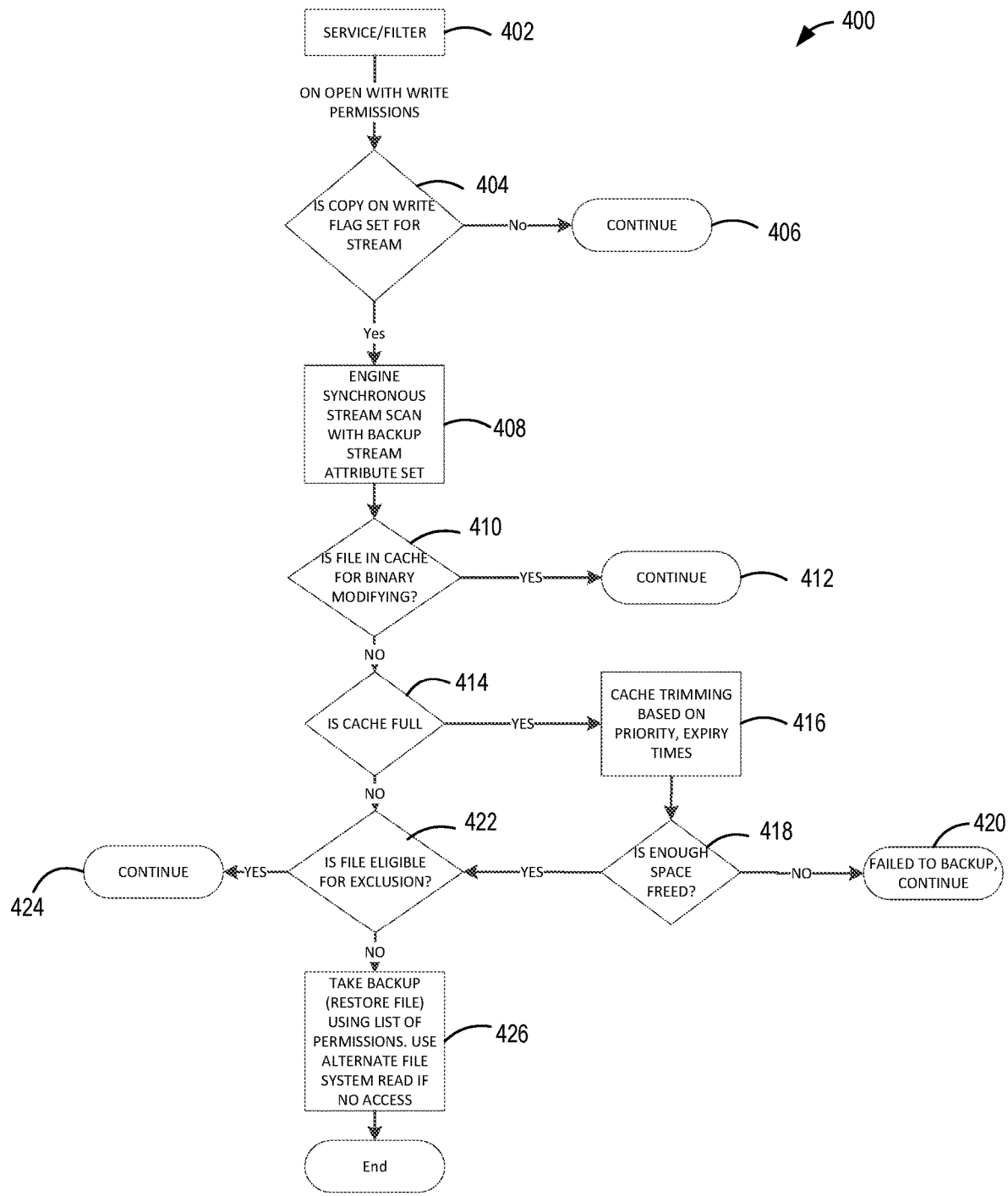
FIG. 4 is an exemplary schematic block diagram illustrating a file caching process according to an embodiment.

A method 400 for caching files used in file restoration and remediation is shown in FIG. 4. In particular, this figure is an exemplary flow chart illustrating operations of a computing device for copy-on-write for system files. At 402, the computing device initiates an anti-virus/malware protection service and file filtering operation. As described herein, files having a defined file types are stored in system cache prior to an I/O request write to the file being performed. At 404, a determination is made whether a cache file copying functionality is initiated. For example, a determination is made whether a CopyOnWrite flag is set for a particular data stream. If the flag is not set, then the method 400 ends at 406 and normal system operations resume. If the flag is set, then at 408 the computing device monitors or scans I/O requests and operations to determine if a file of the defined file type is to be modified (e.g., a write operation is to be performed on the file). An engine synchronous stream is scanned in one example (e.g., scanning by the engine 210 illustrated in FIG. 2) with a restore (or backup) attribute set. During scanning operation, the computing device scans for particular file types to be copied for malware protection, such as by identifying flies having a restore (or backup) stream attribute set. In one example, this identifies to the computing device that the file should be copied to cache and the process, module and/or script, or other entity requesting the I/O write should be indicated when storing the file (e.g. store identification information of the process and/or entities requesting the I/O write with the file).

The computing device then determines at 410 whether the file to be stored in cache is a file wherein the I/O request relates to a binary modification (i.e., a modification to a binary file). If the I/O request does not relate to a binary modification, then normal system operation resumes at 412 and the file is not cached as a restore file. If the I/O request relates to a binary modification, then the computing device determines at 414 whether the system cache where the file is to be stored is full. If the system cache is full (i.e., no additional storage for restore file), then a cache trimming is performed at 416 to reduce the number of files in the system cache. For example, files may be removed based on priority or expiry time, among other factors. A determination is then made by the computing device at 418 whether there is storage space in the cache to copy the identified file. It should be noted that the cache trimming in some examples is performed periodically and not only upon a determination that the storage space is full.

If the storage space still cannot store the file, then the copy fails and the system returns to normal operation at 420. In this event, a notification of the failure is provided to the user or an administrator, which can result in a manual deletion of files or an increase in the storage space of the system cache being used to save copies the files.

If the cache is not filled as determined at 414 or if space is freed up at 418, then at 422 the computing device determines whether the file is eligible for exclusion at 422. For example, a determination is made when the file is modified by a protected process light (PPL) process, in which case the computing device scan skips the copy of the file as the file was modified by a trusted program and normal operation of the system resumes at 424. If a determination is made that the file is not eligible for exclusion at 422, then a restore copy of the file is stored in system cache at 426. For example, the copying is performed using a list of permissions (e.g., an access control lists (ACL), with an alternate file system read (e.g., a virtual file system (VFS) read) performed if there is no access. Thus, a revert file that is a previous version of a modified file can be used to restore the file if the file was modified by malware. Using the restore files stored in cache, upon a malware detection metadata update, affected files may be cleaned by replacing the files with a previous version stored in the cache.

Figure 5:
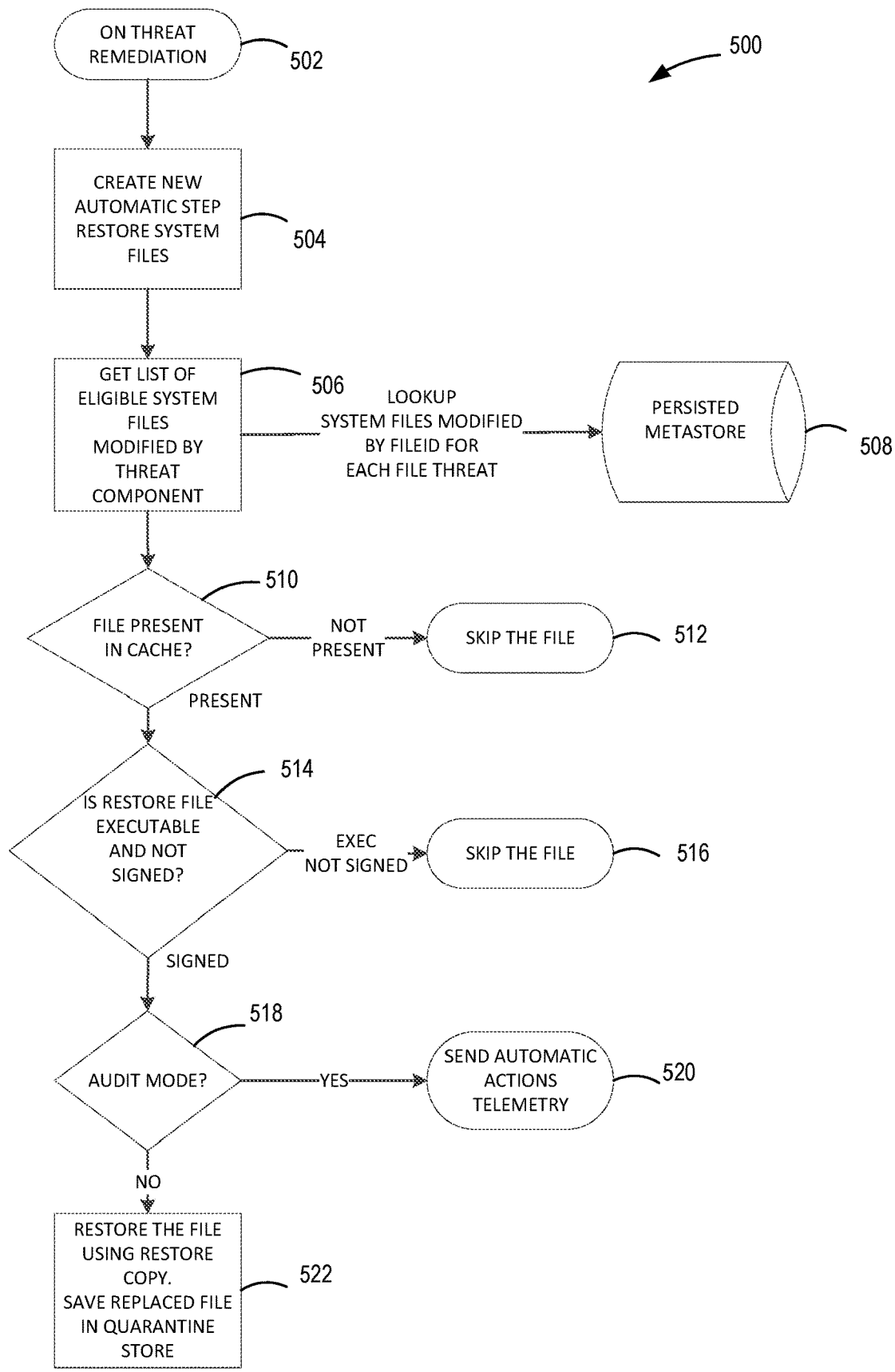
FIG. 5 is an exemplary schematic block diagram illustrating a system remediation process according to an embodiment.

A method 500 for system remediation is shown in FIG. 5. In particular, this figure is an exemplary flow chart illustrating operations of a computing device for using cached files for restoration and system remediation. At 502, a malware remediation process is initiated. For example, an On Threat remediation functionality is initiated that includes scanning and copying files as described by the method 400 shown in FIG. 4 and which may be used for operating system remediation upon a determination that a scanned or monitored file was modified by malware.

The computing device at 504 creates a list of files to be scanned when an I/O request for writing to those file types is to be performed. As described herein, the computing device intercepts the I/O requests to determine if the request relates to a write operation for a monitored file. In one example, new automatic step restore system files are created, which includes storing different versions of the file prior to each write operation. For example, storing of the different versions includes storing a different version of the file immediately prior to a first process or program modifying the file and then immediately before a second different process or program later modifies the file. Thus, the system cache can store multiple restore versions of the same file.

At 506, the computing device obtains a list of eligible system files that have been modified, such as modified by a threat component (e.g., modified by a program or process included in a malware detection metadata update). In one example, the computing device looks up modified system files based on a file identification (FILEID) for each file threat. In one example, this information is retained in a persisted metastore at 508. The persisted metastore can define a periodicity of a malware detection metadata update based at least upon a level of threat of the malware.

If the file type is not present in the cache at 510, then the computing device skips the file copy at 512. Specifically, if the file type if not stored in the system cache, then the file is not capable of remediation to restore to a previous version. If the file is present in the system cache, the computing device determines at 514 whether the restore file is executable and not signed. That is, a determination is made whether the executable file has been subjected to a code signing process wherein the software author is confirmed as an author that ensures that the code is trusted (e.g., has not been altered or corrupted since being signed). If the executable file is not signed, then the computing device skips the file at 516. Similarly, in some examples, if the restore file is not an executable file, then the file is skipped.

However, if the restore file is an executable file and signed, then the computing device determines whether an audit mode is active at 518. If an audit mode is activated (e.g., selected by a user) then the computing device sends automatic actions to telemetry at 520. For example, this can be a test to ensure that expected events are ejected. The audit mode allows for testing of the cache copying and remediation process to ensure that the various aspects are operating properly (e.g., copying defined file types, skipping proper files, etc.).

If an audit mode is not active, then at 522 the file is restored, such as to a previous version, using the restore file stored in the system cache. As part of the remediation, in some examples, the replaced file is stored within a quarantine store, which then may be further analyzed, such as to determine whether the quarantine was as a result of a false positive detection of malware.

Thus, the present disclosure provides effective and efficient restoration of malware affected files and remediation of the operating system to a pre-malware attack state. The malware remediation provides a "defender" function allowing the system to more easily identify files affected by malware and replace the files with clean versions of the files, which include user data in various examples.

Exemplary Operating Environment

Figure 6:
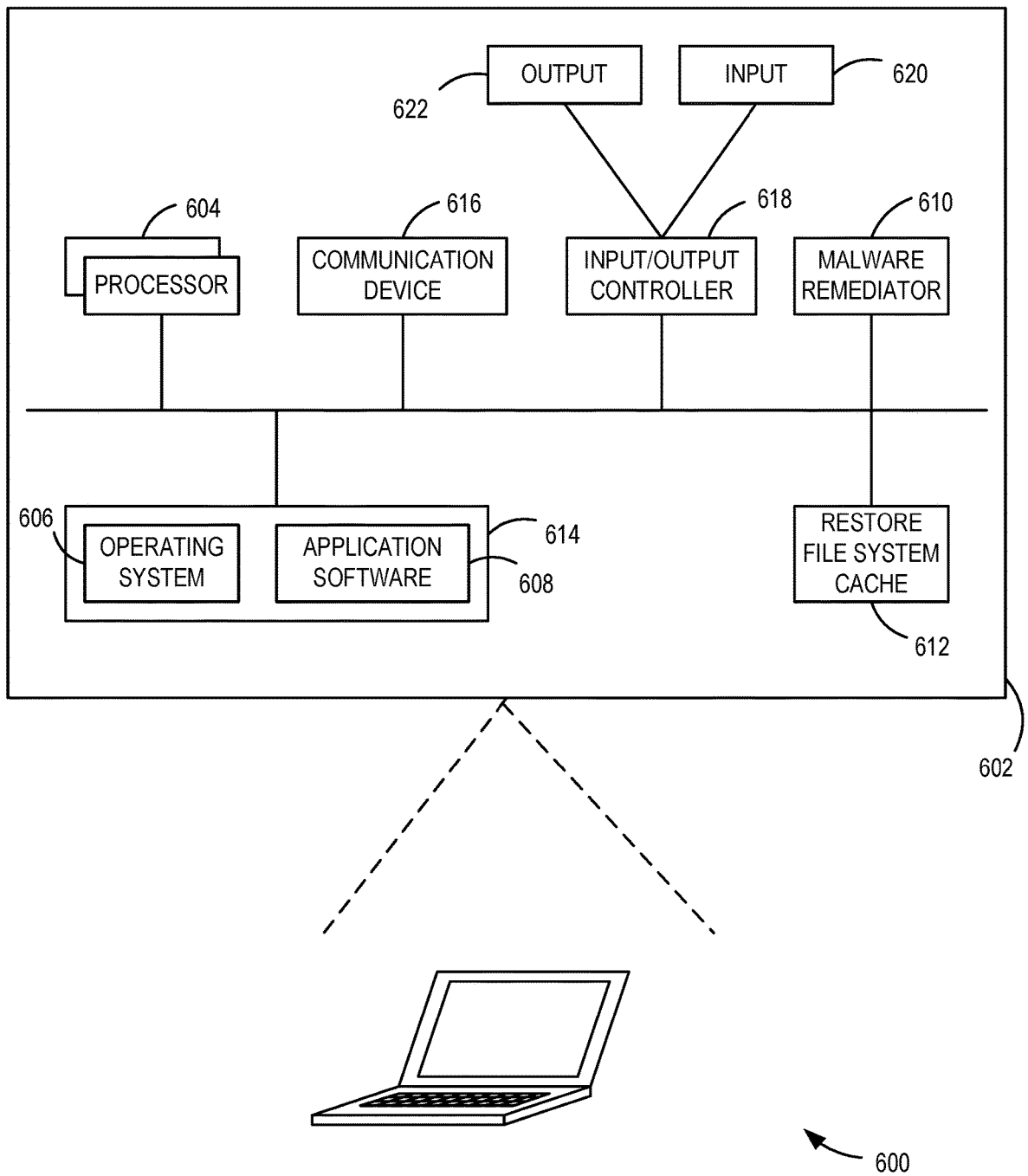
FIG. 6 illustrates a computing apparatus according to an embodiment as a functional block diagram.

The present disclosure is operable with a computing apparatus 602 according to an embodiment as a functional block diagram 600 in FIG. 6. In one example, components of the computing apparatus 602 may be implemented as a part of an electronic device according to one or more embodiments described in this specification. The computing apparatus 602 comprises one or more processors 604 which may be microprocessors, controllers or any other suitable type of processors for processing computer executable instructions to control the operation of the electronic device. Platform software comprising an operating system 606 or any other suitable platform software may be provided on the apparatus 602 to enable application software 608 to be executed on the device. According to an embodiment, remediation of malware activities by a malware remediator 610 using a restore file system cache 612 may be accomplished by software.

Computer executable instructions may be provided using any computer-readable media that are accessible by the computing apparatus 602. Computer-readable media may include, for example, computer storage media such as a memory 614 and communications media. Computer storage media, such as the memory 614, include volatile and nonvolatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 614) is shown within the computing apparatus 602, it will be appreciated by a person skilled in the art, that the storage may be distributed or located remotely and accessed via a network or other communication link (e.g. using a communication device 616).

The computing apparatus 602 may comprise an input/output controller 618 configured to output information to one or more input devices 620 and output devices 622, for example a display or a speaker, which may be separate from or integral to the electronic device. The input/output controller 618 may also be configured to receive and process an input from the one or more input devices 620, for example, a keyboard, a microphone or a touchpad. In one embodiment, the output device 622 may also act as the input device 620. An example of such a device may be a touch sensitive display. The input/output controller 618 may also output data to devices other than the output device 622, e.g. a locally connected printing device. In some embodiments, a user may provide input to the input device(s) 620 and/or receive output from the output device(s) 622.

In some examples, the computing apparatus 602 detects voice input, user gestures or other user actions and provides a natural user interface (NUI). This user input may be used to author electronic ink, view content, select ink controls, play videos with electronic ink overlays and for other purposes. The input/output controller 618 outputs data to devices other than a display device in some examples, e.g. a locally connected printing device.

NUI technology enables a user to interact with the computing apparatus 602 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 602 is configured by the program code when executed by the processor(s) 604 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for operating system remediation, the system comprising:
at least one processor;
a system cache configured to store file restore data; and
at least one memory comprising computer program code, the at least one memory and the computer program code configured to, with the at least one processor, cause the at least one processor to:
intercept input/output (I/O) requests to write to one or more files;
store, as the file restore data, (i) a restore copy of the one or more files to the system cache prior to performing write operations of the I/O requests and (ii) identification information for one or more processes or entities making the corresponding I/O requests in the system cache; and
revert to the restore copy of the one or more files using the file restore data and based at least on a later determination that one or more processes or entities making the corresponding I/O requests was malware by replacing a current version of the one or more files with the restore copy of the one or more files that represent a previous version of the one or more files.

The system described above, wherein the at least one memory and the computer program code are further configured to, with the at least one processor, cause the at least one processor to determine whether the one or more processes that made the I/O requests corresponding to the restore copy of the one or more files in the system cache was malware based on an updated malware detection metadata, the determination made within a defined time period since the updated malware detection metadata was received based at least on a severity level of the malware.

The system described above, wherein the at least one memory and the computer program code are further configured to, with the at least one processor, cause the at least one processor to quarantine files determined to be modified by malware in a quarantine store and restore a current version of the quarantined files based on a user input indicating that the one or more quarantined files was not modified by malware, the quarantine of the files being a result of a false positive detection of malware.

The system described above, wherein the one or more files comprise a defined set of selected files including at least one of (i) system files, including at least one of configuration files, browser setting files, executable files, shortcut files, or initialization files or (ii) user data.

The system described above, wherein the at least one memory and the computer program code are further configured to, with the at least one processor, cause the at least one processor to exclude files modified by a protected process from being stored in the system cache.

The system described above, wherein the system cache is configured having a maximum size and the computer code is further configured to cause the processor to remove stored files upon exceeding the maximum size based at least on a time period the files have been stored in the system cache.

The system described above, further comprising a persisted metastore defining a periodicity of a malware detection metadata update based at least on a level of threat of the malware.

A computerized method for operating system remediation, the computerized method comprising:
intercepting input/output (I/O) requests to write to one or more files;
storing, as file restore data, (i) a restore copy of the one or more files to system cache prior to performing write operations of the I/O requests and (ii) identification information for one or more processes or entities making the corresponding I/O requests; and
reverting to the restore copy of the one or more files using the file restore data and based at least on a later determination that one or more processes or entities making the corresponding I/O requests was malware.

The computerized method described above, further comprising automatically removing a restore file type of a file to be stored or adding a restore file type of a file to be stored based at least on a time period since a last quarantine of the restore file type.

The computerized method described above, further comprising performing the storing in an audit mode without reverting to the restore copy of the one or more files.

The computerized method described above, further comprising determining whether the one or more processes that made the I/O requests corresponding to the restore copy of the one or more files in the system cache was malware using an updated anti malware detection metadata, the determination made within a defined time period since receiving the updated malware detection metadata based at least on a severity level of the malware.

The computerized method described above, further comprising quarantining files determined to be modified by malware in a quarantine store and restoring a current version of the one or more of the quarantined files based on a user input indicating that the one or more quarantined files was not modified by malware, the quarantine of the one or more files being a result of a false positive detection of malware.

The computerized method described above, wherein the one or more files comprise a defined set of selected files including at least one of (i) system files, including at least one of configuration files, browser setting files, executable files, shortcut files, or initialization files or (ii) user data.

The computerized method described above, further comprising excluding files modified by a protected process from being stored in the system cache.

One or more computer storage media having computer-executable instructions for operating system remediation that, upon execution by a processor, cause the processor to at least:
intercept input/output (I/O) requests to write to one or more files;
store, as file restore data, (i) a restore copy of the one or more files to a system cache prior to performing write operations of the I/O requests and (ii) identification information for one or more processes or entities making the corresponding I/O requests in the system cache; and
revert to the restore copy of the one or more files using the file restore data and based at least on a later determination that one or more processes or entities making the corresponding I/O request was malware.

The one or more computer storage media described above having further computer-executable instructions that, upon execution by a processor, cause the processor to automatically remove a restore file type of a file to be stored or add a restore file type of a file to be stored based at least on a time period since a last quarantine of the restore file type.

The one or more computer storage media described above having further computer-executable instructions that, upon execution by a processor, cause the processor to determine whether the one or more processes that made the I/O requests corresponding to the restore copy of the one or more files in the system cache was malware using an updated malware detection metadata, the determination made within a defined time period since receiving the malware detection metadata based at least on a severity level of the malware.

The one or more computer storage media described above having further computer-executable instructions that, upon execution by a processor, cause the processor to quarantine files determined to be modified by malware in a quarantine store and restore a current version of the one or more of the quarantined files based on a user input indicating that the one or more quarantined files was not modified by malware, the quarantine of the one or more files being a result of a false positive detection of malware.

The one or more computer storage media described above, wherein the one or more files comprise a defined set of selected files including at least one of (i) system files, including at least one of configuration files, browser setting files, executable files, shortcut files, or initialization files or (ii) user data.

The one or more computer storage media described above having further computer-executable instructions that, upon execution by a processor, cause the processor to exclude files modified by a protected process from being stored in the system cache.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 604 together with the computer program code stored in memory 614 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for operating system remediation, the system comprising:
   at least one processor;
   a system cache configured to store file restore data; and
   at least one memory comprising computer program code, the at least one memory and the computer program code configured to, with the at least one processor, cause the at least one processor to:
   intercept an input/output (I/O) request to write to a file;
   determine that the I/O request relates to a binary modification to a file within a defined list of system binary files;
   add to or remove from the defined list of system binary files at least one file based at least on a duration of time since a last quarantine for a file type corresponding to the at least one file;
   store, as the file restore data,
      a restore copy of the file to the system cache prior to performing write operations of the I/O request and,
      identification information for a process or entity associated with the corresponding I/O request in the system cache in response to the I/O request being related to the binary modification of the file that is within the defined list; and
   revert to the restore copy of the file using the file restore data and based at least on a later determination that process or entity associated with the corresponding I/O request was malware, the restore copy replacing a current version of the file and representing a previous version of the file.

2. The system of claim 1, wherein the at least one memory and the computer program code are further configured to, with the at least one processor, cause the at least one processor to determine that the process associated with the I/O request corresponding to the restore copy of the file in the system cache was malware based on updated malware detection metadata, the determination made within a defined time period since the updated malware detection metadata was received based at least on a severity level of the malware.

3. The system of claim 1, wherein the at least one memory and the computer program code are further configured to, with the at least one processor, cause the at least one processor to quarantine a file determined to be modified by malware in a quarantine store and restore a current version of the quarantined file based on a user input indicating that the quarantined file was not modified by malware, the quarantine of the file being a result of a false positive detection of malware, and store the restore copy using an access control list (ACL) of permissions, and use an alternate file system read for files having no access.

4. The system of claim 1, wherein the file comprises a portion of a copy of the file or an entire copy of the file, the file being one of a defined set of selected files including at least one of system files, including at least one of configuration files, browser setting files, executable files, shortcut files, or initialization files, or being user data, and wherein the determining is performed on different file paths and the defined set of selected files comprises malware targeted files, and wherein the at least one memory and the computer program code are further configured to, with the at least one processor, cause that at least on processor to store different versions of the file restore data including storing a different version of the file immediately prior to a first process or program modifying the file and then immediately before a second different process or program later modifies the file.

5. The system of claim 1, wherein the at least one memory and the computer program code are further configured to, with the at least one processor, cause the at least one processor to exclude a file modified by a protected process from being stored in the system cache, including determining that the restore copy of the file is executable and signed, and skipping the restore copy in response to the restore copy of the file not being signed, and restoring the restore copy of the file in response to the restore copy of the file being signed and an executable file, wherein the protected process comprises a protected process light (PPL) process.

6. The system of claim 1, wherein the system cache is configured having a maximum size and the computer code is further configured to cause the processor to remove a stored file upon exceeding the maximum size based at least on a time period the file has been stored in the system cache.

7. The system of claim 1, further comprising a persisted metastore defining a periodicity of a malware detection metadata update based at least on a level of threat of the malware.

8. A computerized method for operating system remediation, the computerized method comprising:
intercepting an input/output (I/O) request to write to a file;
determining that the I/O request relates to a binary modification to a file within a defined list of system binary files;
adding to or removing from the defined list of system binary files at least one file based at least on a duration of time since a last quarantine for a file type corresponding to the at least one file;
storing, as file restore data,
a restore copy of the file to system cache prior to performing write operations of the I/O request and,
identification information for process or entity associated with the corresponding I/O request in response to the I/O request being related to the binary modification of the file that is within the defined list; and
reverting to the restore copy of the file using the file restore data and based at least on a later determination that process or entity associated with the corresponding I/O request was malware, the restore copy replacing a current version of the file and representing a previous version of the file.

9. The computerized method of claim 8, further comprising automatically removing a restore file type of a file to be stored or adding a restore file type of a file to be stored based at least on a time period since a last quarantine of the restore file type.

10. The computerized method of claim 8, further comprising modifying the defined list periodically based on one of a number of attacks on a defined file or defined file type over a period of time, or a length of time since the last malware attack on the defined file or defined file type.

11. The computerized method of claim 8, further comprising determining that at least one process that made the I/O request corresponding to the restore copy of the file in the system cache was malware using an updated malware detection metadata, the determination made within a defined time period since receiving the updated malware detection metadata based at least on a severity level of the malware.

12. The computerized method of claim 8, further comprising quarantining a file determined to be modified by malware in a quarantine store and restoring a current version of the quarantined file based on a user input indicating that the quarantined file was not modified by malware, the quarantine of the file being a result of a false positive detection of malware.

13. The computerized method of claim 8, wherein the file comprises a portion of a copy of the file or an entire copy of the file, the file being one of a defined set of selected files including at least one of system files, including at least one of configuration files, browser setting files, executable files, shortcut files, or initialization files, or being user data.

14. The computerized method of claim 8, further comprising excluding a filed modified by a protected process from being stored in the system cache.

15. A computer storage medium having computer-executable instructions for operating system remediation that, upon execution by a processor, cause the processor to at least:
intercept an input/output (I/O) request to write to a file;
determine that the I/O request relates to a binary modification to a file within a defined list of system binary files;
add to or remove from the defined list of system binary files at least one file based at least on a duration of time since a last quarantine for a file type corresponding to the at least one file,
store, as file restore data,
a restore copy of the file to a system cache prior to performing write operations of the I/O request and,
identification information for a process or entity associated with the corresponding I/O request in the system cache in response to the I/O request as being related to the binary modification of the file that is within the defined list; and
revert to the restore copy of the file using the file restore data and based at least on a later determination that process or entity associated with the corresponding I/O request was malware, the restore copy replacing a current version of the file and representing a previous version of the file.

16. The computer storage medium of claim 15 having further computer-executable instructions that, upon execution by a processor, cause the processor to automatically remove a restore file type of a file to be stored or add a restore file type of a file to be stored based at least on a time period since a last quarantine of the restore file type.

17. The computer storage medium of claim 15 having further computer-executable instructions that, upon execution by a processor, cause the processor to determine that the process associated with the I/O request corresponding to the restore copy of the file in the system cache was malware using updated malware detection metadata, the determination made within a defined time period since receiving the updated malware detection metadata based at least on a severity level of the malware.

18. The computer storage medium of claim 15 having further computer-executable instructions that, upon execution by a processor, cause the processor to quarantine a file determined to be modified by malware in a quarantine store and restore a current version of the quarantined file based on a user input indicating that the quarantined file was not modified by malware, the quarantine of the file being a result of a false positive detection of malware.

19. The computer storage medium of claim 15, wherein the file comprises a portion of a copy of the file or an entire copy of the file, the file being one of a defined set of selected files including at least one of system files, including at least one of configuration files, browser setting files, executable files, shortcut files, or initialization files, or being user data.

20. The computer storage medium of claim 15 having further computer-executable instructions that, upon execution by a processor, cause the processor to exclude a file modified by a protected process from being stored in the system cache.

\* \* \* \* \*